A. SCHOELLER.
COMBINED AMPERE AND VOLT METER.
APPLICATION FILED DEC. 2, 1913.
1,195,508.
Patented Aug. 22, 1916.
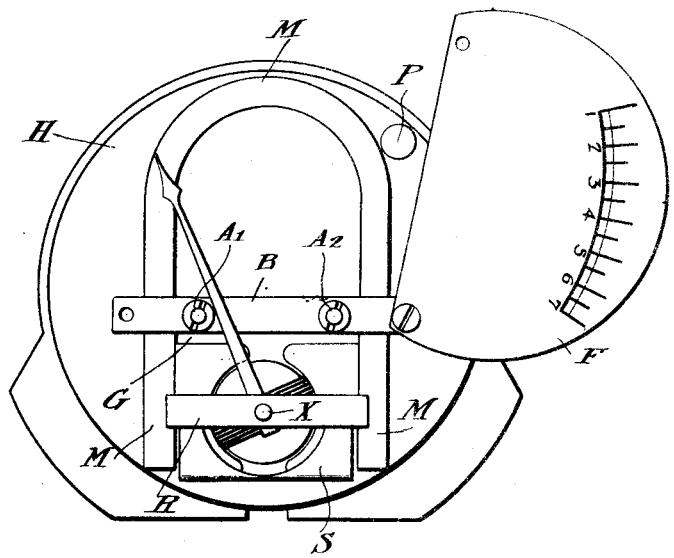
Fig. 1.
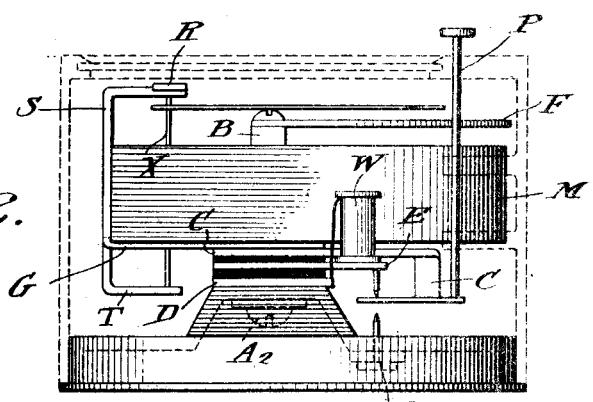
Fig. 2.
Fig. 4.
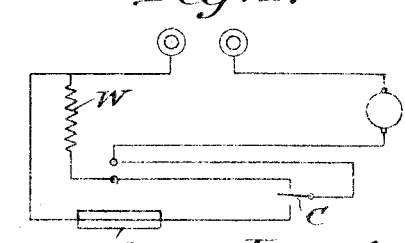
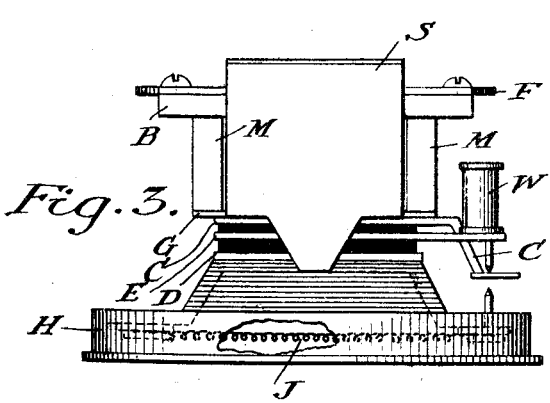
Fig. 3.
Inventor:
Alfred Schoeller
By Julius C Dowell
his attorney

UNITED STATES PATENT OFFICE.

ALFRED SCHOELLER, OF FRANKFORT-ON-THE-MAIN, GERMANY.

COMBINED AMPERE AND VOLT METER.

1,195,508. Specification of Letters Patent. Patented Aug. 22, 1916.

Application filed December 2, 1913. Serial No. 804,208.

*To all whom it may concern:*

Be it known that I, ALFRED SCHOELLER, a citizen of the German Empire, residing at Frankfort-on-the-Main, Hesse-Nassau, Prussia, Germany, have invented certain new and useful Improvements in a Combined Ampere and Volt Meter; and I do hereby declare the following to be a full, clear, and exact description of the invention, such as will enable others skilled in the art to which it appertains to make and use the same.

This invention relates to a suitable construction of electrical measuring instrument particularly for measuring current and voltage for use in vehicles and other structures subject to continual vibration.

The invention rests upon the consideration that it is of substantial advantage in instruments permanently exposed to vibration to diminish as much as possible the number of connecting screws and particularly to avoid small screws which cannot be locked, and further to be as sparing as possible of terminals for electric connections. In consequence of the jarring to which motor cars, railway vehicles, and the like are exposed, both electrical and mechanical connections become loose and then cause disturbances, the origin of which is only discovered with great difficulty.

The object of the present invention is to obtain greater reliability of operation, together with increased cheapness and accuracy of measurement.

According to the present invention the permanent magnets, the supporting plate for the series resistance, the terminal springs for the moving coil, the series resistance, and the change-over contacts of the instrument are arranged one above the other with the necessary insulation between them, and all of these parts are fastened upon a base plate by means of a bridge beam and only two screws.

The accompanying drawings illustrate one construction according to the invention.

Figure 1 showing the instrument from above; Fig. 2 showing it from one side, Fig. 3 from the front, and Fig. 4 is a diagram of the circuit.

Referring to these drawings, nearly all the parts necessary for a combined amperemeter and volt-meter, except the moving system, are fastened upon a base plate H by means of only two screws A', A² (Fig. 1). These parts are a contact spring C, connected with one end of the moving coil, a series resistance W for voltage measurements, a terminal piece D, and a plate E. These parts are fastened together in a rigid whole with the supporting plate G for the moving system, the magnet M, and a bridge piece B, by means of the two screws A', A². The two screws A', A² therefore carry the whole of the internal parts of the instrument.

The separate parts are insulated from one another by intervening layers of mica as far as this is necessary for the connections. By means of the contact spring C the moving system can be connected for voltage measurements in series with the resistance W, or for current measurements across the shunt J into the circuit to be measured. This is achieved by the contact points mounted respectively upon the plate E carrying the resistance W, and upon the shunt J. The bridge piece B further carries the scale F. The moving system S is fastened upon its support G, and has its spindle turning in the upper and lower plates R. T. In the case illustrated, one terminal is the casing of the instrument itself. Therefore the plate D on which one end of the resistance W is fastened is supported without insulation directly on the base plate H. The other end of the resistance W is connected to the plate E. The shunt J is insulated from the base plate and therefore from the casing.

Having now particularly described and ascertained the nature of my said invention and in what manner the same is to be performed, I declare that what I claim is:

1. A combined ampere and volt meter comprising a base, a permanent magnet, a series resistance, a plate supporting said series resistance, a moving coil, a terminal piece for said moving coil and the series resistance, a bridge-piece, and a pair of screws engaging said bridge-piece and securing said parts to the base, substantially as described.

2. A combined ampere and volt meter comprising a base, a permanent magnet, a series resistance coil, a shunt resistance coil, a plate supporting the series resistance coil, a moving system, a plate supporting the moving system, a terminal piece, a contact member, contact points for said series and shunt coils, a bridge-piece, and a pair of screws passing through said bridge-piece, the supporting plates, and the terminal piece, and securing said parts and the permanent magnet to the base, substantially as described.

In testimony whereof I affix my signature in the presence of two witnesses.

ALFRED SCHOELLER.

Witnesses:
FRIEDRICH CARL WENTZEL,
MAX HERMANN HÖPNER.